Sept. 15, 1970 M. A. XAVIER ET AL 3,529,215

DIGITAL OFF FREQUENCY RELAY

Filed Oct. 2, 1967 2 Sheets-Sheet 1

INVENTORS
MIGUEL A. XAVIER
SIDNEY R. PLATT

BY McGrew & Edwards
ATTORNEYS

DIGITAL OFF FREQUENCY RELAY

Filed Oct. 2, 1967 2 Sheets-Sheet 2

INVENTORS
MIGUEL A. XAVIER
SIDNEY R. PLATT
BY McGraw & Edwards
ATTORNEYS

United States Patent Office 3,529,215

Patented Sept. 15, 1970

3,529,215
DIGITAL OFF FREQUENCY RELAY

Miguel A. Xavier and Sidney R. Platt, Denver, Colo., assignors to Hathaway Instruments, Inc., Denver, Colo., a corporation of Colorado Filed Oct. 2, 1967, Ser. No. 672,236
Int. Cl. H01h 47/20
U.S. Cl. 317—147 7 Claims

ABSTRACT OF THE DISCLOSURE

A frequency deviation relay for electric power systems comprises basic digital counting circuitry including a high frequency clock and a counter for accumulating the number of clock pulses in each cycle of the alternating voltage of the system; an underfrequency registers more clock pulses then normal and an overfrequency less. A coincidence detector is employed to sense a deviation in frequency. Unnecessary operations of the relay are prevented by employing a timer which requires a predetermined number of non-normal or "faulted" voltage cycles to occur before the relay is tripped. The relay is inhibited from operating during switching transients, loss of voltage and frequencies above or below a predetermined value. The relay is highly accurate and may be set to extremely close tolerances to the nominal frequency of the system.

This invention relates to frequency deviation relays and particularly to an improved and highly accurate frequency deviation relay of the digital type.

In electric power systems and even more so in extensive power networks the frequency of the alternating voltage is a critical parameter. A change from the nominal frequency of a power system indicates an abnormal condition making it necessary to disconnect equipment to protect it from damage. Frequency responsive relay controls are employed for automatically disconnecting equipment on the system in the event of either underfrequency or overfrequency conditions. This frequency relaying has heretofore been accomplished by analog techniques employing various types of relay equipment. For example, induction cylinder relay devices, frequency discriminator circuits and magnetic circuitry using ferroresonant circuits or saturating magnetic circuits. It is desirable to provide frequency responsive relays in a power system which have consistent and accurate performance at different locations in the system. The frequency relay systems heretofore employed have not proved entirely satisfactory for all present day electric power system applications and accordingly it is an object of this invention to provide an improved frequency responsive relay.

It is another object of this invention to provide an improved frequency responsive relay which is highly accurate and may be set to extremely close tolerances of the nominal frequency of a power system.

It is another object of this invention to provide an improved frequency responsive relay which is immune to voltage changes over a wide range.

It is another object of this invention to provide an improved frequency responsive relay which is immune to switching transients of the power system on which it is employed.

It is another object of this invention to provide an improved frequency responsive relay which is immune to temperature variations.

It is a further object of this invention to provide an improved frequency responsive relay which is capable of very high speed operations.

Briefly, in carrying out the objects of this invention in one embodiment thereof, an underfrequency relay is provided which comprises a high frequency pulse generator or clock and a digital counter for accumulating the number of high frequency pulses during each cycle of the power system voltage. The counter is reset at the end of each cycle of the system voltage. A coincidence detector is employed which produces a pulse output whenever a set number of pulses corresponding to a predetermined underfrequency is accomulated. The relay is tripped upon the accumulation of a preset number of under or "faulted" cycle pulses but the faulted cycle counter is reset and the relay is not tripped if an intermediate normal or non-faulted cycle occurs. In addition, the operation of the relay is inhibited upon the occurrence of normal system switching operations, a predetermined high or low frequency, or a normal fault clearing.

The features of novelty which characterize this invention are pointed out with particularity in the claims amended to and forming a part of this specification. The invention itself, however, both as to its organization and its method of operation, together with further objects and advantages thereof will best be understood by reference to the following description taken in connection with the accompanying drawings in which:

Figure 1:
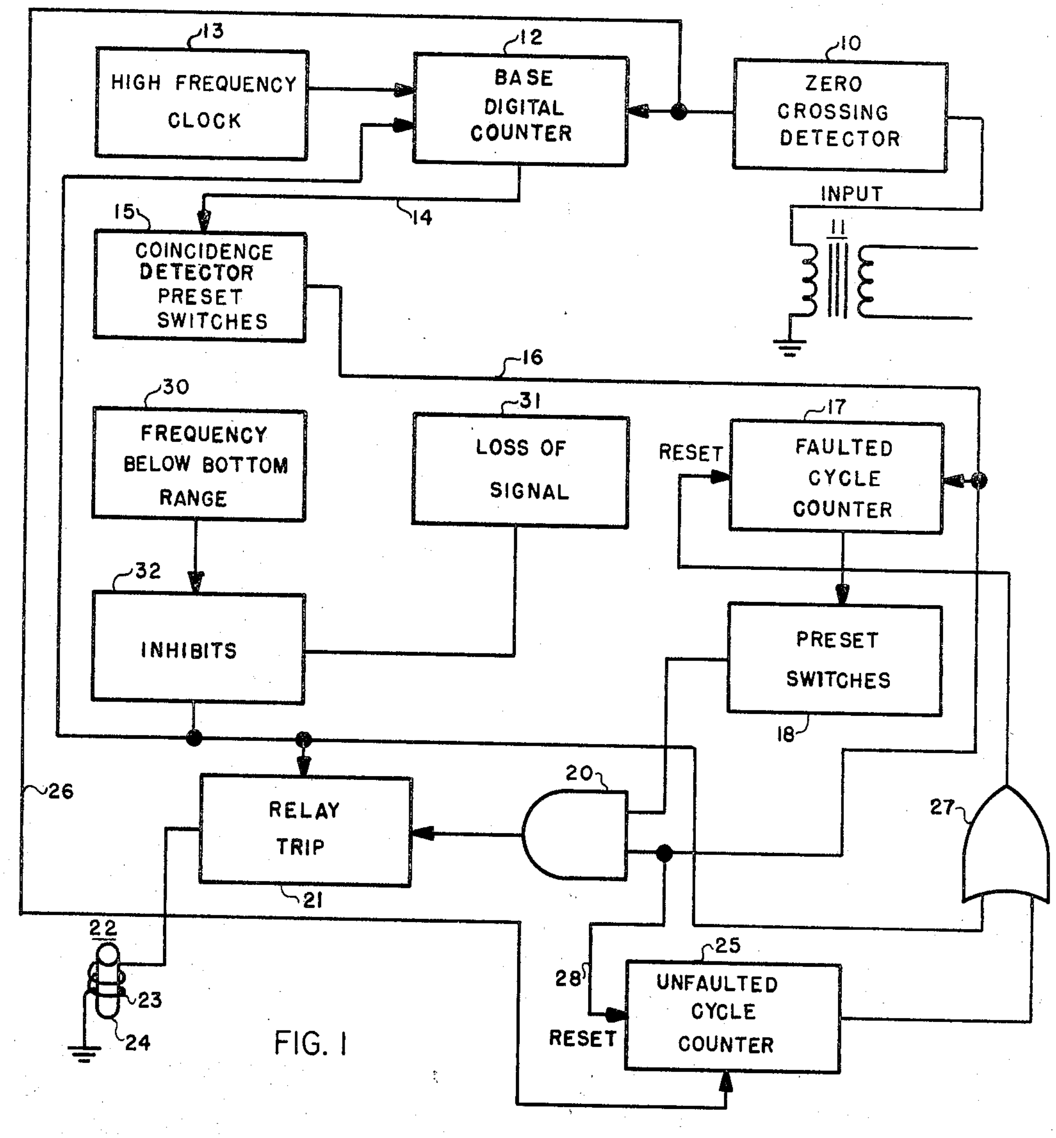
FIG. 1 is a block diagram of an underfrequency relay embodying this invention.

Referring now to the drawings, the underfrequency relay illustrated in FIG. 1 comprises a zero crossing detector 10 connected to be supplied with alternating voltage from the relayed power system through an isolating transformer 11. The zero crossing detector comprises an amplifier and a clipping circuit for producing a square wave and a differentiating circuit for producing narrow pulses at the output spaced at the same intervals as alternate zero crossing points of the incoming voltage wave. The output of the detector 10 is supplied to a pirmary or base digital counter 12. A high frequency crystal oscillator clock 13 is connected to the counter 12 so that the counter counts the number of pulses of the clock occurring between the alternate zero crossing pulses supplied to the counter. The counter 12 is reset by each successive zero crossing pulse during the operation of the counter. The counter pulses are supplied through a series of connections 14 to a coincidence detector 15 having preset switches which may be set to predetermined counts corresponding to selective underfrequency conditions. These switches may be arranged to be set in either a true binary or a binary coded system depending upon the type of counter used. A greater number of the clock pulses are received by the base counter for an underfrequency cycle than for a cycle at the nominal frequency of the system. In the event the count for one cycle exceeds the total for the nominal frequency and reaches or coincides with the preset count of the detector 15 before the counter 12 is reset the detector 15 produces a fault indicating pulse. This fault pulse is supplied through a line 16 to a faulted cycle digital counter 17.

A coincidence detector 18 having presetting switches is connected to receive and accumulate the pulse count from the faulted cycle counter 17; if the count reaches the preset value a pulse is generated and is supplied to an AND gate 20. The line 16 is also connected to the AND gate and upon the concurrence of a pulse on the line 16 and the pulse from the coincidence detector 18 a pulse is supplied to circuitry in a relay trip 21, and this circuitry actuates a relay 22. The relay 22 may be of any suitable type either electromechanical or solid state and by way of example has been indicated as of the electromechanical type comprising a coil 23 and a core or armature 24. Operation of the relay actuates a circuit breaker or an alarm (not shown).

Figure 2:
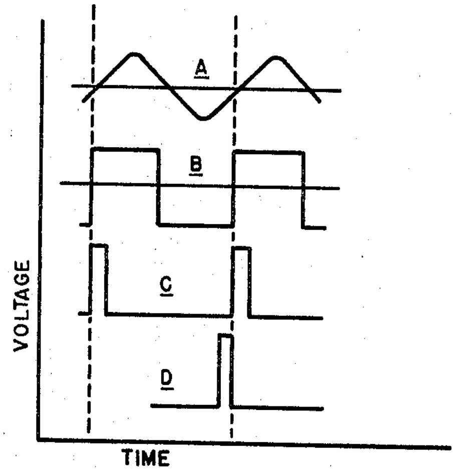
FIG. 2 is a set of curves illustrating certain characteristics of the relay of FIG. 1.

The characteristic wave forms of the input, the detector 10 and the coincidence detector 15 are shown in FIG. 2. The curve A of FIG. 2 represents the sinusoidal input voltage, the curve B, the square wave generated by the clipper-amplifier of the detector 10, the curve C, the spaced pulses generated by the differentiator of the detector 10 and curve D the single pulse output of the detector 15 upon coincidence of the base count of the counter 12 and the preset count of the detector. The pulse D indicates an underfrequency condition and is registered on the counter 17.

In order to prevent indefinite accumulation of faulted cycle time, a good or "unfaulted" cycle counter 25 is provided. This counter is supplied through a line 26 with the differential output pulses of the zero crossing detector 10 and, when a predetermined count of good cycles greater than one has been accumulated, produces a pulse which is supplied through an OR gate 27 to the reset terminal of the counter 17. This resets the counter 17. A count greater than one, say from 2 to 20, is employed in order to prevent error in the case of line or system switching during a fault. The counter 25 is reset by a faulted cycle or underfrequency pulse on the line 16 which is connected to the reset terminal of the counter 25 through a line 28.

The time delay effected by the counter 17 prevents unnecessary relay operations during normal system operations such as switching, and normal fault clearing. The relay is further protected from undesired operation by inhibiting controls which disconnect the relay circuit from operation in the event of abnormally low system frequency or of loss of line voltage or of the voltage of the direct current power supplies. In the illustrated embodiment a bottom frequency detector 30 and a voltage loss detector 31 are connected to actuate an inhibiting control 32 which is connected to supply a disabling signal to the relay trip circuitry 21 and to reset the counters 12 and 17. Either of the detectors 29 and 29 will initiate operation of the inhibitor circuit 32.

Among the advantages of the relay described above are immunity from voltage changes over a wide range, high speed and accuracy, immunity from temperature effects from rates of change of frequency and from switching transients. The relay is constructed of solid state components and may be made without moving parts. When employing a 200 kHz. (kilocycles per second) clock, setting with 0.1 Hz. are possible for both over and underfrequency relays, and higher clock rates will produce a still more accurate system.

The details of the circuitry of the components of the relays disclosed herein have not been illustrated or described because these components are well known in the art and the details thereof are not essential to an understanding of the present invention.

Figure 3:
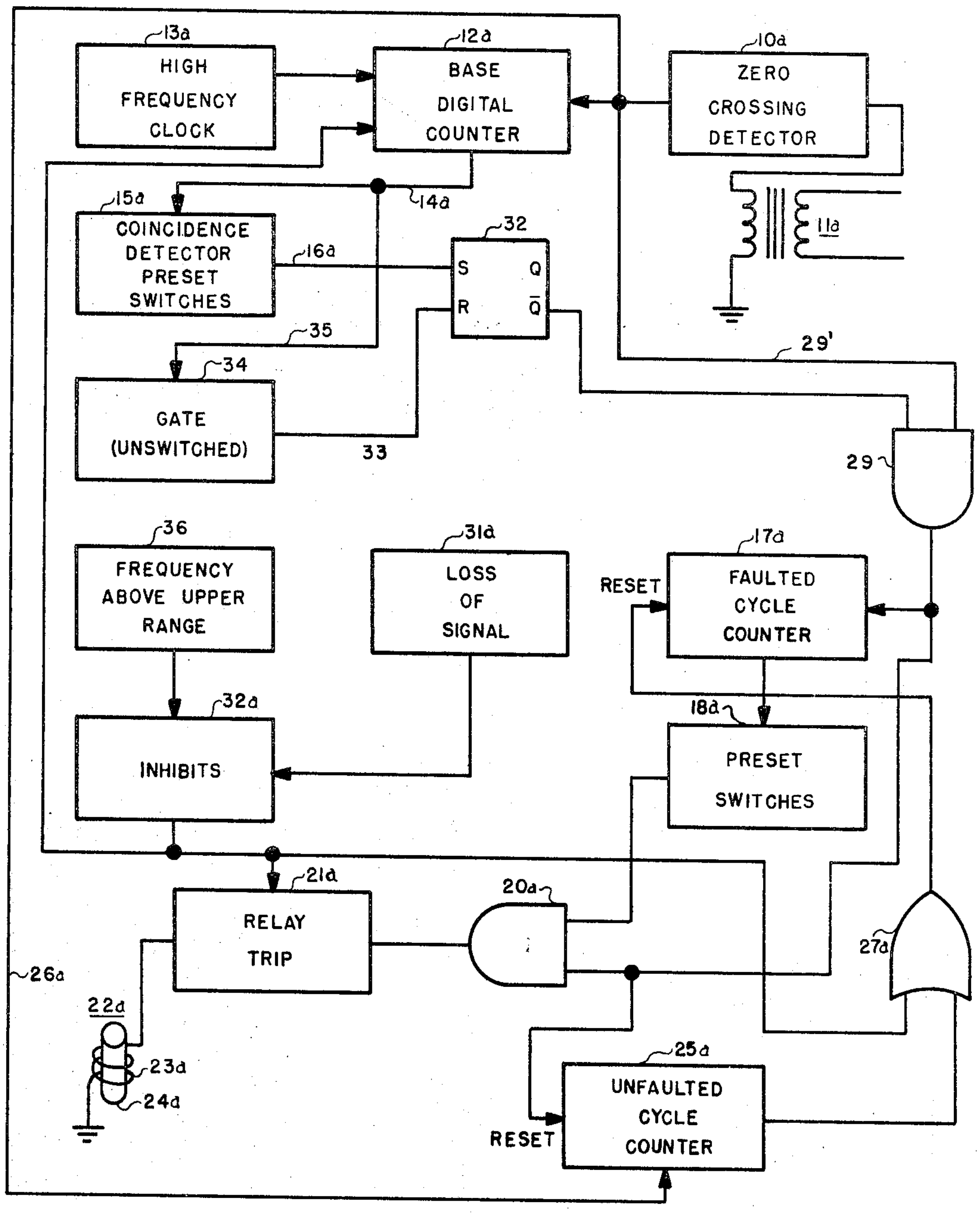
FIG. 3 is a block diagram of an overfrequency relay embodying this invention.

The overfrequency relay illustrated in FIG. 3 includes the same components as the underfrequency relay of FIG. 1, together with additional components to effect response to overfrequency conditions. The corresponding components of the relay of FIG. 3 have been designated by same numerals employed in the relay of FIG. 2 with the suffix letter *a*. In order to supply to the faulted cycle counter a signal representing overfrequency conditions and AND gate 29 is provided having its output connected to the input of the faulted cycle counter. One input of the gate 29 is connected by a line 29 to the zero crossing detector **10*a* and the other input is connected to the output terminal of a flip-flop 32. This terminal being indicated by the letter $\overline{Q}$. The opposite terminal marked S is connected to the underfrequency line 16*a*. The other terminal of the flip-flop marked R is connected by a line 33 to a gate 34** the input of which is connected by a set of lines

35 to lines **14*a* and thus to the digital counter 12*a*. The coincidence gate 34 is set to produce a pulse at its output in response to an accumulated count representing a frequency substantially above the normal frequency of the system which may, for example, be 70 Hz. During the operation of the relay system of FIG. 3 the counter 12*a* accumulates the count during each cycle and supplies the count to the coincidence detector 15*a*. This detector is set for a frequency higher than the normal frequency of the system by way of example at 60.1 Hz. Whenever the count reaches the set value a pulse is produced at the output of detector 15*a*. This pulse is an underfrequency indicator with respect to the frequency setting to be detected by the relay. If the flip-flop 32 is in its upper position this underfrequency pulse will reverse the flip-flop and the zero crossing pulse supplied by the line 29 will not pass through the gate 29. This is the condition for unfaulted cycle operation and the unfaulted cycle counter 25*a* operates as in the first embodiment. The gate 34 having been set at 70 cycles receives a count signal corresponding to 70 cycles before the 60 cycle count has been accumulated at coincidence detector 15*a* and the gate produces a ready pulse which when supplied through line 33 shifts the flip-flop to its reset position; the unfaulted cycle signal thus reverses the flip-flop which is returned to its set position by the pulse through line 16*a*. When an over frequency condition exists the zero crossing pulse from the detector 10*a* will energize the line 29 and pass gate 29 to indicate a faulted cycle. It will be understood that, when no signal has been supplied through line 16*a* the flip-flop remains in its higher frequency position and activates gate 29 so that the pulse arriving on the line 29 passes this gate. As in the embodiment of FIG. 1 the faulted cycle passing through gate 29 will reset the unfaulted counter 25*a* and when the unfaulted cycle counter again operates it will on its second or higher selected count reset the counter 17*a*. A multiple but fixed number of good or unfaulted cycle counts will reset the faulted cycle counter; this prevents an error in the event of line or system switching during a fault. It will now be seen that the overfrequency indication is given by the relay when there is an absence of coincidence of the count and the setting at the detector 15*a***, the zero crossing pulse occurring before the pulse representing normal frequency would occur.

The inhibiting controls of the relay of FIG. 3 are essentially the same as those of FIG. 1 except that instead of the low frequency control 30 a high frequency (above upper range) control 36 has been shown.

The relay system as described above is highly accurate and may be set to extremely close tolerances to the nominal frequency depending on the clock frequency. For a clock frequency of 200 kHz. the setting of the relay may be 59.9 and even higher for underfrequency relays and 60.1 Hz. for overfrequency relays. The system is immune to temperature effects and to rate of change of the frequency input. The relay may comprise only solid state elements and thus be constructed without moving parts. No warm up time is required for accurate operation of the relay.

While specific embodiments of the invention have been illustrated and described other applications and arrangements would occur to those skilled in the art; therefore it is not desired that the invention be limited to the details illustrated and described and it is intended, by the appended claims, to cover all modifications which fall within the spirit and scope of the invention.

We claim:

1. A frequency responsive relay for an alternating voltage electric power system and the like operating at a predetermined normal frequency comprising means for generating pulse signals one at the beginning of each cycle of the alternating voltage of the system, a constant frequency high frequency pulse generator, digital means for counting the number of high frequency pulses of said generator occurring during each period between adjacent ones of said pulse signals, means for resetting said counting means at the end of each one cycle of said system voltage, and means responsive to a cycle count of said counting means different from that for a cycle at said normal frequency for actuating said relay.

2. A frequency responsive relay as set forth in claim 1 including means for relaying the actuation of said relay for a predetermined number of system cycles, said delaying means affording actuation of said relay dependent upon the occurrence of a predetermined number of different count cycles prior to the occurrence of a predetermined number of successive normal count cycles.

3. A frequency responsive relay as set forth in claim 1 including means responsive to a change in a characteristic of the voltage wave of said system other than frequency for preventing the actuation of said relay.

4. A frequency responsive relay as set forth in claim 1 wherein said means responsive to a different cycle count comprises a preset underfrequency indicator and a faulted cycle counter.

5. A frequency responsive relay as set forth in claim 4 including an unfaulted cycle counter and means associated therewith and responsive to a predetermined member of unfaulted cycles for resetting said faulted cycle counter.

6. A frequency responsive relay as set forth in claim 5 including means responsive to a faulted cycle signal for resetting said faulted cycle counter.

7. A frequency responsive relay as set forth in claim 4 responsive to overfrequency and including an AND gate having its output connected to the input of said faulted cycle counter and having one of its input terminals connected to the output of said pulse generating means, a flip-flop having one output terminal connected to the other input of said AND gate and one input terminal connected to the output of said underfrequency indicator, means connected to said digital means for generating a ready pulse at a count corresponding to a predetermined frequency substantially higher than that of said system and having its output connected to the other input terminal of said flip-flop, said ready pulse activating said flip-flop to energize said one output terminal and thereby said other input of said AND gate whereby said gate conducts upon receiving a pulse signal from said first mentioned means, said flip-flop being reversed by a pulse from said underfrequency indicator whereby said AND gate passes only overfrequency signals.

References Cited

UNITED STATES PATENTS

| | | | |
|---|---|---|---|
| 2,918,625 | 12/1959 | Houghton et al. | 324—79 X |
| 3,278,845 | 10/1966 | Cann. | |

J D MILLER, Primary Examiner

W. J. SMITH, Assistant Examiner

U.S. Cl. X.R.

307—129; 317—138

UNITED STATES PATENT OFFICE
CERTIFICATE OF CORRECTION

Patent No. 3,529,215 Dated September 15, 1970

Inventor(s) Miguel A. Xavier et al.

It is certified that error appears in the above-identified patent and that said Letters Patent are hereby corrected as shown below:

Column 2, line 9, "accomulated" should read -- accumulated --. Column 3, line 41, "29 and 29" should read -- 30 and 31 --; line 50, "setting with" should read -- settings within --; line 68, "29", second occurrence, should read -- 29' --. Column 4, line 16, "29", first occurrence, should read -- 29' --; line 28, "29", first occurrence, should read -- 29' --; line 32, "29", second occurrence, should read -- 29' --. Column 5, line 3, after "each" cancel "one"; line 4, before "cycle" insert -- one --; line 8, "relaying" should read -- delaying --; lines 24 and 25, "member" should read -- number --; line 29, "faulted" should read -- unfaulted --.

Signed and sealed this 1st day of June 1971.

(SEAL)
Attest:

EDWARD M.FLETCHER,JR.
Attesting Officer

WILLIAM E. SCHUYLER, JR.
Commissioner of Patents